United States Patent [19]

Goode et al.

[11] Patent Number: 6,114,475

[45] Date of Patent: Sep. 5, 2000

[54] REACTOR DRYING BY ADDITION OF COMPOUND THAT LOWERS BOILING POINT OF WATER

[75] Inventors: Mark Gregory Goode, Hurricane; Eldon Ronald Larsen, Charleston; Hemal Ranchhod Patel, Scott Depot; Jeffery Scott Bradley, Dunbar, all of W. Va.

[73] Assignee: Union Carbide Chemicals & Plastics Technology Corporation, Danbury, Conn.

[21] Appl. No.: 09/055,915

[22] Filed: Apr. 6, 1998

[51] Int. Cl.[7] ............................... F26B 1/00; C08F 2/34
[52] U.S. Cl. .................. 526/62; 34/341; 34/437
[58] Field of Search ............................... 526/62; 34/341, 34/437

[56] References Cited

U.S. PATENT DOCUMENTS

| | | | |
|---|---|---|---|
| 3,507,849 | 4/1970 | Daues . | |
| 3,922,322 | 11/1975 | Roger et al. | 260/878 B |
| 4,003,712 | 1/1977 | Miller | 23/288 |
| 4,035,560 | 7/1977 | Caumartin et al. | 526/124 |
| 4,069,376 | 1/1978 | Minchak | 526/137 |
| 4,166,167 | 8/1979 | Bye et al. | 526/142 |
| 4,263,466 | 4/1981 | Colon et al. | 585/421 |
| 4,532,311 | 7/1985 | Fulks et al. | 526/62 |
| 5,028,674 | 7/1991 | Hatch . | |
| 5,075,395 | 12/1991 | Durand et al. | 526/105 |
| 5,077,358 | 12/1991 | Durand et al. | 526/125 |
| 5,317,036 | 5/1994 | Brady . | |
| 5,541,269 | 7/1996 | Niwa et al. | 526/62 |
| 5,548,040 | 8/1996 | Cann et al. | 526/62 |
| 5,712,352 | 1/1998 | Brant et al. | 526/68 |
| 5,834,571 | 11/1998 | Bernier . | |

FOREIGN PATENT DOCUMENTS 032088  3/1977  Japan ........................... 526/62

OTHER PUBLICATIONS

Lange's Handbook of Chemistry 14th Ed. pp. 5.57–5.61.

*Primary Examiner*—David J. Buttner
*Attorney, Agent, or Firm*—P. W. Leuzzi; S. R. Bresch

[57] ABSTRACT

There is provided a process for drying a fluidized reactor system comprising introducing a boiling point depressing agent into said system optionally while heating said system.

6 Claims, No Drawings

REACTOR DRYING BY ADDITION OF COMPOUND THAT LOWERS BOILING POINT OF WATER

FIELD OF THE INVENTION

The invention relates to improved drying or water removal of a fluidized reactor. More particularly, the present invention relates to improved drying, especially of a gas phase fluidized reactor used for polymerizations employing a metallocene catalyst, by adding a compound that lowers the boiling point of water or a mixture of the compound and water, and/or by adding a compound that reacts with water to scavenge it.

BACKGROUND OF THE INVENTION

Drying the reactor prior to initiating polymerization is an important step in starting a polymerization reactor. In the polymerization of olefins and diolefins, it is generally considered necessary to remove any water present or to reduce it to low levels. In the reactor, water can be present as a physically or chemically adsorbed or absorbed species throughout the system, and it can also exist as free water in dead areas of the reactor system such as in unmixed or unheated flanges and nozzles.

Many methods have been applied to reactor systems with and/or without a seed bed present to minimize the amount of water present in the reactor system. These can include pressure purging one or more times with an inert gas such as nitrogen at an elevated temperature, or flow purging the reactor system with nitrogen or other suitable inert gases at a reduced pressure. A vacuum can be placed on the reactor system, preferably at elevated temperature, to reduce the level of water. The vacuum can be applied repeatedly if desired.

Typical vacuum drying can use pressures from just below atmospheric to about 50 mm Hg, and preferably to about 5 to 10 mm Hg. Such high vacuums are difficult but not impossible to achieve for large scale industrial equipment. Vacuums in the range of about 100 to 750 mm Hg aid in the removal of liquid water from the reaction system. The higher vacuums are required to remove adsorbed water from the reactor surfaces. The reactor may first be heated under pressure and then vented to near atmospheric pressure and the vacuum applied while the reactor is still hot in order to improve the drying step. Ideal temperatures are in the range of about 40 to 130° C. The drying is improved as the time duration of the vacuum increases and is typically in the range of about 5 minutes to 2 hours. Insulating the reactor or the external application of heat to the reactor vessel aid in maintaining a high temperature as the system is vacuum dried.

Hydrocarbons such as ethane, ethylene, propane, propylene, butane, isobutane, 1-butene, n-pentane, isopentane, n-hexane and 1-hexene have been introduced and circulated in the gaseous state to increase the heat capacity of a circulating medium and thus speed drying.

Alkyl aluminum and other alkyl metal compounds such as trimethyl aluminum, triethyl aluminum and diethyl zinc have been introduced to reactor systems in the presence or absence of a seed bed to passivate the system or to serve as scavengers for poisons before commencing polymerization. Generally, prior to the introduction of the aluminum alkyl compound, the reactor system is dried to reduce water levels to at least about 10 to 150 ppmv (concentration of water in the circulating medium)—usually less than 50 ppmv and sometimes less than 5 ppmv. It is obvious to those skilled in the art that the above procedures can be applied in combination to improve the drying of the reactor. As an example, the reactor may be dried under vacuum prior to the introduction of the aluminum alkyl to reduce the formation of reaction products of the aluminum alkyl and water and thus improve reactor start-up, operability and resistance to sheet formation.

The drying step can be an expensive and time consuming process, particularly if water has been introduced into the system during shutdown. Such would be the case, for example, if the reactor internals were water-blasted to remove polymer deposits. Experience has shown that water may lay in dead areas such as flanges, tubing or adjacent piping connected to the reactor, and be difficult to remove. Although the reactor is heated during the drying steps, such peripheral areas do not reach the same high temperatures as the main body of the reactor and are more difficult to dry. Heating these areas individually can improve drying but this may prove to be a cumbersome and expensive option with irreproducible results. Heating methods include insulation, heat tracing and the application of hot water or steam to the external surfaces. These areas may also constructed to be as free-draining back into the main part of the reaction system as possible in order to prevent pooling. It is not uncommon for the reactor moisture level to be measured to about 50 ppmv water within a few hours after beginning the drying procedure, and then remain there for several hours or even days. This usually indicates the presence of a liquid pool of water collected in a low spot in the reaction system, and has been confirmed by disconnecting the piping at the low spot and blowing out the liquid water. Blowing the water out of the line to the atmosphere improves reactor drying. Flushing the water back into a hotter part of the reactor also improves drying. Flushing may be accomplished with gas or liquids, including the compounds of the present invention.

The presence of water may adversely impact polymerizations which employ metallocene, Ziegler-Natta or chromium-based catalysts by the generation of electrical charges in the reactor and reaction medium, leading to sheeting, polymer agglomeration, and/or fouling of the reaction system. The polymerization may also be retarded by the presence of water, causing the reaction to start slowly and to have decreased catalyst productivity. This is especially true for chromium based catalysts such as those based on chromium oxide and silyl chromate.

In one method of operation, the reactor system is dried and started under conditions of polymerization or using a catalyst system that is less sensitive to catalyst poisoning or reactor operational problems associated with the residual water in the polymerization system. After a period of time, typically about 5 to 40 bed-turn-overs, the water is sufficiently scavenged and the conditions or catalysts more sensitive to water can be used without difficulty. The reactor may be operated in the presence of scavengers such as aluminum alkyl cocatalysts during this time to improve the drying. In one method especially applicable to chromium based catalysts, the reactor is operated or baked-out with polymerization at high temperatures of about 90 to 125° C. (often while producing medium to high density polymers) for several bed-turn-overs until the expected productivity of the catalyst and molecular weight of the polymer is achieved. Then the reactor is transitioned to a lower temperature to produce a product of desired properties.

Drying a reactor that last produced polymer using a metallocene catalyst is more difficult than if the reactor last produced polymer using a Ziegler-Natta or chromium catalyst. This is due to increased compositional homogeneity of the metallocene based polymers, causing them to soften and melt at temperatures that are 10 to 15° C. lower than comparable (molecular weight and density) resins prepared using conventional Ziegler-Natta or chromium catalysts. Thus, metallocene containing resins cannot be heated as hot as Ziegler-Natta or chromium containing resins during drying. Because a 10° C. drop in temperature lowers the vapor pressure of water considerably, the corresponding drying times of a reactor and/or seed bed in metallocene polymerization systems are much longer than those for Ziegler-Natta or chromium based resins.

The fluidized reactor polymer seed bed is commonly dried by circulating an inert fluidizing gas through the bed and around a recirculation system consisting of a blower and a heat exchanger that is used to heat the inert gas. The upper limit to the drying temperature is set by the hottest surface in contact with the polymer. Generally, this is the temperature of the heat exchanger and/or the temperature of the heat transfer medium (e.g. water), and it is maintained at or just below the softening or melting point of the polymer. Drying at temperatures in excess of the softening or melting point of the polymer can melt the polymer on the heat exchanger internal surfaces, recirculation lines, distributor plate or walls of the reaction vessel. Even with no bed in the reactor, drying at excessively high temperature can melt residual polymer that remains in the recirculation lines, heat exchanger or distributor plate, leading to blockages and high pressure drops in the system.

A similar situation to that described above can exist in the preparation of polymers having a low melting point whether produced with a metallocene catalyst or not. Examples of such polymers can include VLDPE, EPR, EPDM, polybutadiene, and polymers of vinyl-substituted aromatic compounds such as styrene. Accordingly, there exists a need to more effectively dry reactor systems to remove water before commencing such polymerizations.

SUMMARY OF THE INVENTION

The present invention provides an efficient method for the removal of water from a reactor system, particularly one that does not leave a residue from the reaction of water with a scavenging compound in the reactor system, and one that is especially effective for drying reactor systems in which polymerizations are conducted utilizing a metallocene catalyst. Using the present invention, reactor drying times can be reduced, reactor start-up improved, and operation costs of the reaction system decreased.

Accordingly, there is provided a process for drying a polymerization reactor system comprising introducing at least one boiling point depressing agent into said system with or without heating said system. There is also provided a process for drying a polymerization reactor system that further comprises introducing a water scavenger into said system that does not leave an adduct that greatly interferes with the polymerization process, with or without heating said system in conjunction with the addition of a boiling point depressing agent.

DETAILED DESCRIPTION OF THE INVENTION

Polymers. The polymers which can be produced using the polymerization reactor system drying method of the present invention are generally olefin or diolefin polymers. Exemplary products include ethylene homopolymers, propylene homopolymers; copolymers of ethylene and at least one $C_3$–$C_{12}$ alpha olefin; terpolymers of ethylene, at least one $C_3$–$C_{12}$ alpha olefin, and at least one diene; copolymers of propylene and at least one $C_4$–$C_{12}$ alpha olefin (e.g., propylene-butene copolymer and propylene-hexene copolymer); polybutadiene; polyisoprene; and polymers of vinyl-substituted aromatic compounds, e.g., polystyrene. Dienes employed particularly in the terpolymers can include, for example, 2-methylpentadiene; 1,5-hexadiene; 5-vinyl-2-norbornene; 1,7-octadiene; 7-methyl-1,6-octadiene; vinylcyclohexene; dicyclopentadiene; isobutylene; ethylidene norbornene; and the like.

Polymerization Process and Conditions. The above-described olefins and/or diolefins and vinyl aromatic compounds may be polymerized in a suspension, solution, slurry, or gas phase process using known equipment and reaction conditions. The present invention is not limited to any specific type of polymerization reactor type or configuration. However, a preferred polymerization process is a gas phase process employing a fluidized bed. Gas phase processes employable in the present invention can include so-called "conventional" gas phase processes, "condensed-mode," and, most recent, "liquid-mode" processes. They may also include stirred beds and fast fluidized reactors with adjacent settling beds.

Conventional fluidized processes are disclosed, for example, in U.S. Pat. Nos. 3,922,322; 4,035,560; 4,994,534, and 5,317,036.

Condensed mode polymerizations, including induced condensed mode, are taught, for example, in U.S. Pat. Nos. 4,543,399; 4,588,790; 4,994,534; 5,317,036; 5,352,749; and 5,462,999. For polymerizations producing alpha olefin homopolymers and copolymers condensing mode operation is preferred.

Liquid mode or liquid monomer polymerization mode is described in U.S. Pat. No. 5,453,471; U.S. Ser. No. 510,375; and WO 96/04322 (PCT/US95/09826) and WO 96/04323 (PCT/US95/09827). For polymerizations such as ethylene-propylene copolymer (e.g., EPMs), ethylene-propylene-diene terpolymer (e.g., EPDMs), and diolefin polymerizations, it is preferable to use liquid mode and to employ an inert particulate material, a so-called fluidization aid. Inert particulate materials are described, for example, in U.S. Pat. No. 4,994,534 and include carbon black, silica, clay, talc, and mixtures thereof. Of these, carbon black, silica, and mixtures of them are preferred.

The polymerizations can be carried out in a single reactor or multiple reactors in series can be employed. The essential parts of the reactor are the vessel, the bed, the gas distribution plate, the inlet and outlet piping, at least one compressor, at least one cycle gas cooler, and the product discharge system. In the vessel, above the bed, there is a velocity reduction zone, and in the bed a reaction zone.

Generally, the above methods of polymerization are carried out in a gas phase reactor containing a "seed bed" of polymer which is the same or different from the polymer being produced. Preferably, the bed is made up of the same granular resin that is to be produced in the reactor.

The bed is fluidized using a fluidizing gas comprising the monomer or monomers being polymerized, initial feed, make-up feed, cycle (recycle) gas, inert carrier gas (e.g., nitrogen, argon, or inert hydrocarbon such as ethane, propane, isopentane) and, if desired, modifiers (e.g., hydrogen). Thus, during the course of a polymerization, the bed comprises formed polymer particles, growing polymer particles, catalyst particles, and optional fluidization aids fluidized by polymerizing and modifying gaseous components introduced at a flow rate or velocity sufficient to cause the particles to separate and act as a fluid.

In general, the polymerization conditions in the gas phase reactor are such that the pressure can range from sub-atmospheric to super-atmospheric, but is typically from about 50 to 1000 psi (345 to 6890 kiloPascals), and preferably is about 100 to 600 psi (689 to 4134 kiloPascals). The polymerization temperature of the bed of granular polymer particles in the reactor is typically from about 0 to 120° C., preferably about 40 to 100° C., and most preferably about 40 to 80° C. The concentration and partial pressure of polymerization components will vary depending upon the particular monomer or monomers employed and the temperature of the polymerization, and can range from about 1 to 300 psi (6.89 to 2,067 kiloPascals), preferably 1 to 200 psi (6.89 to 1378 kiloPascals). For gas fluidized polymerizations in liquid mode employing readily condensable monomers, it is preferred to operate at a partial pressure slightly above to slightly below (that is, for example, ±10° C. for low boiling monomers) the dew point of the monomer.

Catalysts. Any polymerization catalyst can be used with the present method for drying the polymerization reaction system. Suitable catalysts include those of precursor compounds of transition metals (e.g., titanium, zirconium, chromium, vanadium, cobalt, nickel), Ziegler-Natta, metallocene and other single-site and single-site like catalysts, rare earth catalysts (e.g., neodymium), and anionic initiators. These catalysts can be liquids, solids or gases and can be soluble, insoluble, supported, or unsupported. They can be spray dried or employed in prepolymer form. They can be added to the reactor as a solution, slurry, emulsion, gas, liquid, or solid.

The catalyst can be used with activators, cocatalysts and/or promoters, illustrative examples of which include metal alkyls, silicon compounds containing ether linkages, and boron containing discrete activators commonly used with metallocene catalysts. These compounds may be added with the catalyst to the polymerization reactor or added separately from the catalyst to the polymerization reactor.

The catalyst, cocatalyst (such as one or more aluminum alkyls) and/or other components may be impregnated in or deposited on a support, or alternatively, spray dried or prepolymerized with a support material. These support or spray drying materials are typically solid materials which are inert with respect to the other catalyst components and/or reactants employed in the polymerization process. Suitable support materials can include silica, carbon black, polyethylene, polycarbonate, porous crosslinked polystyrene, porous crosslinked polypropylene, alumina, thoria, titania, zirconia, magnesium halide (e.g., magnesium dichloride), and mixtures thereof. The porous particulate supports may be calcined at a temperature sufficient to remove substantially all physically bound water prior to preparation of the catalyst.

Boiling Point Depressing Agent. The boiling point depressing agent can be a compound that forms an azeotrope with water such that the boiling point of water is lowered by at least about 2° C., or it may be a non-azeotrope forming compound or zeotrope that lowers the boiling point of the mixture of that compound and water by at least about 2° C. Such minimum boiling azeotropes and zeotropes that reduce the boiling point of water are disclosed, for example, in the CRC Handbook of Chemistry and Physics (62nd Edition, Chemical Rubber Publishing Company, 1982), Perry's *Chemical Engineer's Handbook* (Perry and Green, 6th Edition McGraw-Hill, New York, 1984), and "Azeotropic Data" (Gmehling, et. al., VCH, New York, 1994).

Suitable minimum boiling azeotropes include binary, ternary, quaternary and quinary systems. Illustrative compounds that can be employed to form a minimum boiling binary azeotrope with water can include acetic acid, ethanol, allyl alcohol, isopropanol, n-propanol, n-butanol, n-pentanol, n-hexyl alcohol, 2-methyl-2-propanol, isobutyl alcohol, 1-butanol, 2-butanol, butyl alcohol (sec), butyl alcohol (tert), 2-ethyl butanol, n-pentanol, 2-pentanol, 3-pentanol, cyclopentanol, 2-methyl pentanol, 4-methyl-2-pentanol, hexanol, isoamyl alcohol, amyl alcohol (tert), 1-chloro-2-propanol, ethylene chlorohydrin, propylene chlorohydrin, 2-ethoxy ethanol, 1-ethoxy-2-propanol, 1-methoxy-2-propanol, acetic acid, acetone (at 1034 mm Hg), ethylidene acetone, methyl ethyl ketone, methylpropyl ketone, methylisopropenyl ketone, methylisobutyl ketone, dipropyl ketone, diisobutyl ketone, ethylbutyl ketone, methylamyl ketone, methyl vinyl ketone, methyl acetate, ethyl acetate, propyl acetate, butyl acetate, isopropyl acetate, isobutyl acetate, 2-methylpropyl acetate, 2-ethylbutyl acetate, hexyl acetate, allyl acetate, isoamyl acetate, 2-heptyl acetate, 3-heptyl acetate, 4-methyl-2-pentyl acetate, 3-methoxybutyl acetate, vinyl acetate, ethyl propionate, propyl propionate, isopropyl propionate, isobutyl propionate, isoamyl propionate, ethyl-3-ethoxy propionate, vinyl propionate, ethyl valerate, propyl isovalerate, ethyl ether, 2-chloroethyl ether, isopropyl ether, ethylbutyl ether, ethyl vinyl ether, butyl ether, 1-butenylethyl ether, vinyl-2-chloroethyl ether, 1-butenylmethyl ether, butylisopropenyl ether, vinylallyl ether, vinylethyl ether, vinylpropyl ether, vinylbutyl ether, vinyl-2-ethylhexyl ether, vinylisopropyl ether, vinylisobutyl ether, isopentane [47.7° C. at 28.5 psia (196.12 kilo-pascal)], n-pentane, n-hexane, n-heptane, n-octane, isooctane, n-nonane, n-decane, 4-methyl-2-pentene, 1-hexene, 1-octene, diisobutylene, cyclohexane, cyclohexene, benzene, ethylbenzene, isopropyl benzene, m-xylene, toluene, 1-methoxy-1,3-butadiene, styrene, carbon tetrachloride, carbon disulfide, chloroform, chloral, nitromethane, nitroethane, ethyl nitrate, acrylonitrile, acrolein, propionaldehyde, butyraldehyde, 2-ethylbutyraldehyde, hexaldehyde, croton aldehyde, isoveralaldehyde, methacrylaldehyde, paraldehyde, valeraldehyde, methylal, 1,2,3,6-tetrahydrobenzaldehyde, 4-pentanal, 2-hexenal, 2-methyl pentanal, diethyl butyral, dimethyl butyral, dimethyl isobutyral, perflourobutyric acid, methyl acrylate, ethyl acrylate, butyl acrylate, ethyl chloroacetate, acetonitrile, propionitrile, butyronitrile, isobutyronitrile, ethyl formate, isopropyl formate, propyl formate, butyl formate, amyl formate, isoamyl formate, ethyl crotonate, vinyl crotonate, pyridine, isoprene, methyl butyrate, methyl isobutyrate, ethyl butyrate, butyl butyrate, 2-ethylbutyl butyrate, isobutyl butyrate, isoamyl butyrate, isobutyl isobutyrate, 4-methyl-2-pentyl butyrate, vinyl butyrate, vinyl isobutyrate, vinyl-2-methyl pentanoate, vinyl-2-ethyl hexanoate, piperidine, triethyl amine, N-methylbutylamine, 1-3-dimethyl butyl amine, butylamine, dibutylamine, diallylamine, triallylamine, hexyl amine, cyclohexylamine, dimethylethanol amine, diethylisopropanol amine, diisopropyl amine, n-ethylcyclohexyl amine, ethyl aniline, 2-picoline, 3-picoline, 4-picoline, dimethylfuran, acetal, dimethyl acetyl, diethyl acetal, dipropyl acetal, diallyl acetal, anisole, 2-6-lutidine, 2-pentanone, cyclopentanone, cyclohexanone, 4-methyl-2-pentanone, 2-heptanone, 3-heptanone, 4-heptanone, 5-methyl-2-hexanone, 2,4-pentanedione, cumene, dicyclopentadiene, mestiylene, camphene, methylene chloride, 1,2-dichloroethane, 1,1,2-trichloroethane, 1,1,2-trichloroethylene, ethylene dichloride, tetrachloroethylene, propyl chloride, 1-chloropropane, isopropyl chloride, propylene dichloride, butyl chloride, allyl chloride, hexyl chloride, 2-ethylhexyl chloride, chlorobenzene, methylvinyl chloride (cis), 1,1,2-trichlorotrifluoroethane, allyl cyanide, 1-4 dioxane, 1,3-dioxalane, trioxane, 1,4-thioxane, epichlorohydrin, n-methyl morpholine, n-ethyl morpholine, mesityl oxide, and propylene oxide (60 psig pressure) Illustrative examples of suitable systems that form ternary minimum boiling azeotropes can include acetal/ethanol/water, acetone/carbon disulfide/water, acetone/chloroform/water, acetone/isoprene/water, acetone/isopropyl ether/water, acetonitrile/benzene/water, acetonitrile/ethanol/water, acetonitrile/isopropyl ether/water, acetonitrile/triethylamine/water, acrylonitrile/ethanol/water, allyl alcohol/allyl ether/water, allyl alcohol/benzene/water, allyl alcohol/carbon tetrachloride/water, allyl alcohol/cyclohexane/water, allyl alcohol/cyclohexene/water, allyl alcohol/hexane/water, allyl alcohol/trichloroethylene/water, benzene/ethanol/water, benzene/isopropanol/water, benzene/methylethyl ketone/water, benzene/2-methyl-2-propanol/water, benzene/propanol/water, benzene/propyl alcohol/water, bromodichloromethane/ethanol/water, 1-bromopropane/ethanol/water, 1-butanol/butyl acetate/water, 1-butanol/butyl ether/water, 1-butanol/butyl acrylate/water, 1-butanol/vinylbutyl ether/water, 2-butanol/2-butyl acetate/water, 2-butanol/butyl ether/water, 2-butanol/cyclohexane/water, 2-butanol/diisobutylene/water, 2-butanol/hexane/water, 2-butanone/carbon tetrachloride/water, 2-butanone/hexane/water, butenylmethyl ether/ethanol/water, tert. butyl alcohol/carbon tetrachloride/water, butyl amine/ethanol/water, butyl amine/isopropanol/water, butyraldehyde/ethanol/water, butyraldehyde/hexane/water, carbon disulfide/ethanol/water, carbon tetrachloride/ethanol/water, carbon tetrachloride/2-butanone/water, carbon tetrachloride/propanol/water, chloroform/ethanol/water, chloroform/methanol/water, 1-chloro-2-methylpropane/ethanol/water, crotonaldehyde/ethanol/water, 1,3-cyclohexadiene/n-propanol/water, cyclohexane/ethanol/water, cyclohexane/ethanol/water, cyclohexane/2-butanone/water, cyclohexane/2-methyl-2-propanol/water, cyclohexane/propanol/water, cyclohexane/isopropanol/water, cyclohexene/ethanol/water, 1,2 -dichloroethane/ethanol/water, cis-1,2-dichloroethylene/ethanol/water, trans-1,2-dichloroethylene/ethanol/water, diethoxymethane/ethanol/water, diethyl formal/ethanol/water, diethyl ketone/propanol/water, diisobutylene/isopropanol/water, dipropyl acetal/propanol/water, dipropyl formal/propanol/water, ethanol/ethyl acetate/water, ethanol/ethyl acrylate/water, ethanol/ethylbutyl ether/water, ethanol/ethyl chloroacetate/water, ethanol/ethylene dichloride/water, ethanol/ethylisobutyl ether/water, ethanol/heptane/water, ethanol/hexane/water, ethanol/isobutyl chloride/water, ethanol/isopropyl acetate/water, ethanol/isopropyl ether/water, ethanol/methylbutyl ether/water, ethanol/methylethyl ketone/water, ethanol/propylisopropyl ether/water, ethanol/toluene/water, ethanol/triethyl amine/water, ethanol/vinylisobutyl ether/water, ethanol/vinylpropyl ether/water, 2-ethoxyethanol/vinyl-2-ethylhexyl ether/water, ethylbutyl ether/isopropanol/water, ethylene dichloride/isopropanol/water, formic acid/m-xylene/water, hexane/methyl ethyl ketone/water, hexane/2-methyl-2-propanol/water, isoamyl acetate/isoamyl alcohol/water, isoamyl alcohol/isoamyl formate/water, isobutyl acetate/isobutyl alcohol/water, isopropanol/isopropyl acetate/water, isopropanol/isopropyl ether/water, isopropanol/methylethyl ketone/water, isopropanol/toluene/water, isopropyl ether/propanol/water, methanol/methyl chloroacetate/water, 2-methoxyethanol/vinyl-2-ethyhexyl ether/water, 3-pentanone/n-propyl alcohol/water, propanol/propyl acetate/water, n-propanol/propyl formate/water, n-propanol/propyl formate/water, propanol/trichloroethylene/water, and propanol/propyl ether/water.

Illustrative examples of suitable systems that form quaternary minimum azeotropes can include water/nitromethane/tetrachloroethylene/n-propyl alcohol, water/nitromethane/tetrachloroethylene/n-octane, water/tetrachloroethylene/n-propyl alcohol/n-octane, water/nitromethane/n-propyl alcohol/n-octane, water/ethyl alcohol/crotonaldehyde/ethyl acetate, water/ethyl alcohol/benzene/cyclohexane, water/ethyl alcohol/benzene/n-heptane, and water/ethyl alcohol/benzene/isooctane.

An illustrative example of a suitable system that forms quinary minimum boiling azeotropes can include water/nitromethane/tetrachloroethylene/n-propylalcohol/n-octane.

Of these systems, those that are miscible or soluble with water or produce azeotropes miscible or soluble with water are more preferred. Generally preferred are azeotropes that form a single phase when mixed with water although two (or higher) phase systems will work for the purpose of this invention, particularly when the concentration of water in the upper phase is large and/or the concentration of water in the lower phase is small and/or the amount of water-rich phase is small. Also preferred are those azeotropes whose components are more volatile than water so that they are easily purged from the reaction system. Azeotropes whose components are considerably more volatile than water such that their boiling points are at least 10° C. below that of water are especially preferred. Another preference requires that the boiling point of the azeotrope to be at least about 2° C. below that of water. More preferred is an azeotrope that boils at least about 10° C. below water. Especially desired is an azeotrope that has a high percentage of water in the azeotrope composition, at least about 2%, more preferred at least about 10%, and most preferred about 20% or higher. Preferred are components of the azeotrope that are available commercially and not overtly toxic or dangerous to handle Also, if some component(s) of the azeotrope is not easily removed from the reaction system, it is preferred that it have minimal detrimental effect on the polymerization. Most preferably, the component should be a component of the polymerization process such as a monomer, comonomer, diluent, solvent or catalyst modifier, that it can act as an anti-fouling agent to prevent polymer build-up on reactor surfaces, or that it be inert or relatively inert to the polymerization process.

Illustrative examples of the more preferred azeotropic systems meeting some or all the above-enumerated preferences include isopropanol/water, ethyl ether/water, acetone/water, acetonitrile/water, acetic acid/water, 1,2-dichloroethane, diisopropyl amine, ethanol/water, propanol/water, 1,1,2-trichloroethane, 1,1,2-trichloroethylene, 1,1,2-trichlorotrifluoroethane/water, triethyl amine, acetonitrile/ethanol/water, cyclohexane/isopropanol/water, cyclohexane/isopropanol/water, 1,2-dichloroethane/ethanol/water, ethanol/hexane/water and isopropanol/methylethyl ketone/water. It may be pointed out that pressure is known to affect the formation of azeotropes and to alter their composition and boiling points. For example, acetone does not form an azeotrope with water at atmospheric pressure but does so at a slightly higher pressure. It is still of value for drying improvement as the drying can be conducted at elevated pressure. Even at atmospheric pressure, acetone improves drying by lowering the boiling point of the water-acetone mixture.

Included in the ternary azeotropic systems suitable for application in the present invention are those in which the solubility of water in hydrocarbons such as n-pentane, isopentane, n-hexane, and cyclohexane (compounds that may be present during polymerization) is improved by the addition of a third component. Such third components include properly selected aldehydes, alcohols and ketones. The amount of phase separation can be reduced and more water can be moved into the hydrocarbon phase. This may result in significant commercial advantage due to increased heat capacity of the circulating medium as well as increased water volatility.

Suitable azeotropes can include hydrocarbons containing fluorine, chlorine and/or bromine such as methylene chloride, chloroform, carbon tetrachloride, 1,2-dichloroethane, ethylene dichloride, 1,1,2-trichloroethane and 1,1,2-trichlorotrifluoroethane. In some instances these compounds can improve the catalyst productivity of certain Ziegler-Natta catalysts and possibly certain metallocene catalysts, and would need not be essentially removed from the reaction system prior to polymerization. These compounds also have specific gravities higher than that of water, and so tend to drive water from the low lying areas of the polymerization reactor system. With the exception of 1,2-dichloroethane, they form an upper liquid layer of the azeotrope that is rich in water and a lower layer lean in water. This also aids the removal of water, particularly the surface-bound water.

Azeotropes that include compounds that may reduce or eliminate fouling on reactor surfaces can also be suitably employed. Amines, amides and nitrites are known to reduce fouling, illustrative examples of which include triethyl amine, dibutylamine, diisopropyl amine, ethyl aniline and acetonitrile, In particular, the diisopropyl amine is of interest due to the duel alcohol functionality and the high water content in the azeotrope.

In the practice of the invention, it is thought that improved performance of the boiling point depressing drying agent is achieved if it is circulated as a liquid through the polymerization system or is allowed to condense in the cooler regions of the system from which residual water may be more difficult to remove. The presence of the liquid improves contact and mixing of the agent with water, whether it is liquid water or surface adsorbed water.

Illustrative examples of zeotropic and other agents that depress the boiling point of water without forming a known azeotrope include methanol, acetone (at atmospheric pressure), tert-butyl methyl ether, dimethyl ether, methyl propyl ether, dibromodifluoromethane, methyl chloride, propylene oxide, trimethylene oxide, 2-chloro-2-methyl propane, propyl amine, ethylene amine, dimethoxyethane, ethyl methyl-2-chloroether, ethyl isopropyl ether, and ethyl methyl ether. Some compounds including propylene oxide, trimethylene oxide, acetone and methanol are infinitely soluble with water and are therefore excellent for removing liquid water from low lying areas of the reactor. Other compounds may be described as very soluble, soluble or slightly soluble in water. The characteristic of some solubility in water is generally preferred in order assist the removal of water.

Additionally, such agents with a normal boiling point in the range of about −50° to 98° C. are preferred, those that boil in the range of about 0 to 95° C. more preferred, and those that boil in the range of about 30° to 90° C. most preferred. The lower temperature specification results from the perceived need to force the agent (whether azeotropic or zeotropic) into the liquid phase in order to aid its mixing with liquid water. Reaction polymerization systems have a minimum lower temperature limit to which the reactor can be cooled. For water cooled systems, this can be in the 30° to 40° C. range. For refrigerated cooling, the limit can be much lower. Reactors also generally operate under elevated pressure. Increasing the concentration or partial pressure of the boiling point depressing agent increases liquification but also increases the amount of agent used. The choice of a boiling point depressing agent will thus include a consideration of reactor cooling limits, agent vapor pressure-temperature relationship, and the amount of agent to be used.

Illustrative examples of ternary systems that can depress the boiling point without forming azeotropes include water/acetonitrile/acetone, water/acetonitrile/diethyl amine, water/methyl alcohol/methyl acetate, water/methyl alcohol/ethyl alcohol, water/isobutyl alcohol/benzene and water/ethyl acrylate/isopropyl ether. Quaternary systems that can depress the boiling point without forming azeotropes include hydrocyanic acid/acrylonitrilelacrolein/water, water/acetonitrile/ethyl alcohol/triethylamine, water/ethyl alcohol/benzene/n-hexane, and water/ethyl alcohol/benzene/methylcyclohexane, Systems that form minimum boiling azeotropes can also depress the boiling point of water even though they are not at their respective azeotropic compositions. The components need not be at their azeotropic composition to be effective for drying. For example, an excess of diethyl ether beyond that required to make the azeotrope leads to an approach temperature of 34.2° C. as the composition approaches 100% ether. For components that have a normal boiling point above that of water but produce a minimum boiling azeotrope, the composition can be within a limited range on either side of the azeotropic composition and still achieve a depression in the boiling point of water.

The boiling point depressing agent can be added neat or as a solution, dispersion, or suspension in a suitable diluent such as a hydrocarbon or mineral oil. When the agent is introduced as a liquid in the form of a slurry or solution, it is dispersed or dissolved in a suitable diluent. Inert diluents can include hydrocarbon or polar compounds or mixtures thereof. The diluent can also be a compound or mixture thereof that forms an azeotrope with water or with the boiling point depressing agent. Exemplary diluents that can be employed are alkanes, cycloalkanes, and aromatics containing from 1–20 carbon atoms, mono- and di- ethers having 2–20 carbon atoms, alkenes having 3–20 carbon atoms, and mixtures of them. Illustrative hydrocarbons are propane, butane, isobutane, isopentane, n-pentane, n-heptane, isooctane, cyclohexane, benzene, toluene, xylene, ethylbenzene, t-butyl benzene, pseudocumeme, 2-butene, cyclooctene, mixtures thereof and the like. Exemplary of some polar compounds suitable for employment as solvents are ethers (e.g., diethyl ether, diisopropyl ether, butyl ether, tetrahydrofuran), thioethers, tertiary amines, mixtures thereof, and the like. Hydrocarbon oils that can be employed include, for example, mineral oil, such as Kaydol®.

A number of factors can be considered when determining how much of a boiling point depressing agent to use. These factors can include, for example, the composition of the azeotrope mixture, the amount of agent that must be used to effect condensation in the reactor system, the amount of water present in the reactor system, the temperature and pressure of the reactor system when the agent is added, whether or not the boiling point depressing agent is to be removed or remain during polymerization.

To determine the quantity of agent to add, the amount of water in the reactor is first estimated. This may be based upon a moisture analysis of the circulating medium in the reactor, the total reactor volume and an estimate of the amount of liquid water remaining in low lying areas. A corresponding quantity of agent is then calculated from the azeotropic composition, or for zeotropic agents, the quantity to add can be estimated from ideal liquid mixing rules, from correlations or from data. The calculated quantity of azeotropic or zeotropic agent may then be doubled, tripled, or added to great excess to insure that a sufficient amount is present to combine with the water present in the reactor system. This applies to zeotropes and to minimum boiling azeotropes wherein the agent boils at a temperature below that of water. A flash calculation is then made to determine if that amount of agent can be condensed to the liquid phase at the conditions of temperature and pressure present within the reactor system during the drying process. Generally, a far greater quantity of agent must be added than that originally calculated in order to condense the agent in the reactor. At the other extreme, the addition of too much condensable agent to the reactor may cause the pressure in the polymerization system to increase beyond the allowable maximum working pressure of the vessel when the agent is vaporized by increasing the reaction temperature. It should be noted, that one skilled in the art will to advantage be able to adjust the amount of agent added and the temperature cycle during the drying step in possible combination with the rate that gases are vented from the reactor such that the pressure in the vessel is controlled well below that of the maximum working pressure even when excess liquid is added.

The amount of agent added to the system is dependent upon a number of factors including the amount of water present, the volume of the system, and the characteristics of the particular agent. The amount added is typically in the range of about 0.01 to 10 wt % of agent relative to the amount of resin that the reactor contains during normal operation, and is more preferably about 0.05 to about 5 wt %. On a volume basis, this corresponds to about 0.05 to 5 liters of additive per cubic meter of reactor volume, and is more preferably about 0.1 to 2 liter per cubic meter. As previously discussed, it is preferred that sufficient agent be added such that it can be present as liquid or can be condensed at some point in the reaction system during the drying process.

For an azeotropic agent that boils at a temperature below that of water, the amount of agent added optimally exceeds the amount required to produce the azeotrope. Typically, the amount of agent added exceeds the azeotropic amount by at least 10%. As the mixture boils, the vapor is richer in water than the liquid and the composition of the remaining liquid moves towards that of the pure agent. All the water evaporates and the agent may likewise be easily removed due to its high volatility. If the amount of agent added is less than that required to form the azeotrope, there is still an improvement in drying but not as much. The vapor is richer in the azeotrope forming agent and the liquid composition moves towards that of pure water. Residual water will remain when the agent is exhausted.

For an agent that boils at a temperature above that of water but still forms a minimum boiling azeotrope, the amount of compound added is optimally less than that required to form the azeotrope. The amount added is typically within the range of about 10 to 95% of that required to form the azeotrope, and usually within the range of about 50 to 90%. The vapor is richer in the agent and pure water will remain when it is exhausted, but a substantial amount of water will have been removed. If excess agent is added, water is preferentially removed but the agent will remain when the water is gone. Removing the water also becomes more difficult because the boiling point of the mixture exceeds that of water as the water concentration in the mixture decreases. There is also the difficulty of removing the agent from the polymerization system because it is less volatile than water.

Such an agent that boils at a temperature above that of water but still forms a minimum boiling azeotrope may be used to advantage even when more than the required azeotropic amount of agent is added. The vapor pressure of water in the reaction system may be decrease to a level such that the adsorbed and liquid water need not be essentially removed prior to polymerization. Also, the composition of the mixture is driven towards that of the higher boiling agent as water is removed, making further vaporization more difficult. Preferably the agent has little or no harmful effect on the polymerization. Possible beneficial effects of such an agent include a reduction in the fouling of the reactor or an enhancement of catalyst performance. It is especially preferable to use such an agent that is also a monomer, comonomer or hydrocarbon diluent in the reaction system. Illustrative examples include glycol diacetate, 2-ethylbutyl butyrate, diethyl ethanolamine, 2,3-dichloropropanol, diacetone alcohol, 1-chloro-2-propanol, benzyl alcohol, 1-methoxy-2-propanol, 2-ethoxy ethanol, propionic acid, diethylisopropanol amine, diethylaminoethyl amine, diisopropalethanol amine, and n-ethylcyclohexyl amine.

An agent that produces a maximum boiling azeotrope is also of some interest when the agent has a lower boiling point than water. Enough of the agent can be added so that the mixture's composition is on the pure agent's side of the maximum boiling point. Drying is initially improved, but the liquid composition moves towards the maximum boiling azeotrope which then becomes difficult to remove from the polymerization system without a means to eliminate the azeotrope. Hydrogen nitrate is an illustrative example of a maximum boiling azeotrope that has a normal boiling point less than water.

An agent that produces a maximum boiling azeotrope (regardless of the agents boiling point) can also be used advantageously to decrease the vapor pressure of water in the reaction system to a level such that the adsorbed and liquid water need not be essentially removed prior to polymerization. Such an agent is added to the polymerization system at an amount relative to the water present to increase the normal boiling point of the water by at least 2° C., preferably by at least 5° C., more preferably by at least 10° C., and most preferably by at least 20° C. The composition of the mixture is driven further towards the high boiling azeotrope as water and agent are removed, making further vaporization more difficult. Preferably the agent has little or no harmful effect on the polymerization. Possible beneficial effects of such an agent include that the fouling of the reactor is reduced and that the catalyst performance is enhanced. It is especially desirable if the agent is a monomer, comonomer or hydrocarbon diluent in the reaction system. Illustrative, non-limiting examples include ethylene diamine and formic acid. Ethylene diamine has a normal boiling point of 116.5° C. and forms an azeotrope with water at atmospheric pressure with a boiling point of 119.0° C. containing 81.6 wt % ethylene diamine and 18.4 wt % water in a single phase. When, for example, added to the reactor at approximately this proportion relative to the water present, ethylene diamine effectively immobilizes the water and prevents or reduces its participation in the polymerization reaction. Zeotropic compounds that have a boiling point above that of water will function in a similar fashion, particularly those compounds that are relatively soluble or miscible with water. Examples of such compounds include acetamide (normal boiling point of 221° C.) and pinacol (normal boiling point of 174° C.). By adding the appropriate amount of agent relative to water, the effective boiling point of water can be increased by at least 2° C. and can be made to approach that of the zeotropic agent. These compounds may themselves interfere with polymerization but can be removed from the reactor by purging. If desired, the reactor may be pre-dried to about the 30 to 100 ppmv level water in the circulating gas (essentially the level that seems to correspond to the condition in which water is evaporating from a trapped liquid pool) before adding the agent that increases water's boiling point in order that high levels of water are not fixed by the agent on the walls of the reactor or other locations that can readily contact and deactivate the catalyst.

Use of the Boiling Point Depressing Agent. The drying process of the present invention can be employed alone or in combination with one or more other known drying processes such as the application of heat, the application of vacuum, pressurized purging, flow purging, or the addition of scavenger, monomer and/or metal alkyl compounds such as, for example, alkyl zinc and alkyl aluminum compound. The boiling point depressing agent can be added to an empty reactor, to a reactor containing a seed bed of polymer, to one or more empty reactors preferably connected in series with or without a seed bed in one or more of them, or it can be used to separately treat the seed bed of polymer outside the reactor system prior to charging to the reactor. When used with a seed bed, increased amounts of agent can be added because to counter the amount adsorbed by the bed. Pre-drying an empty reactor prior to charging the seed bed often decreases the overall drying time of the reactor and seed bed because the empty reactor can be dried at a temperature above that at which the polymer sinters. Such pre-drying can be done with or without the benefit of the present invention.

The boiling point depressing agent can be introduced to the system at any point in the reaction system, preferably to the bed or to the recirculation (recycle) line. The agent can be any phase when added, and may either flash, melt or remain in its original phase when introduced to the reactor. For gas phase fluidized reactors, the agent is entrained in the gas circulating through the system at high velocity. To improve dispersion of a liquid agent through the reactor system to allow it to better mix with water, the agent can be flashed. The agent can then be re-condensed, either slowly or quickly, but preferably slowly so that it condenses in the coolest part of the reaction system first. These cool regions are where the residual water is expected to reside. The procedure for vaporizing and then condensing the agent may improve the subsequent drying procedure.

The drying procedure of this invention may be repeated more than once during the drying process using different drying agents if desired. It may be performed on a reactor restart following a shutdown, or to purge the reaction system of water that is introduced to the reactor during polymerization. The reactor may be further dried after the process of the present invention using known drying procedures (e.g. use of scavengers) or by using known reactive compounds, including, for example, aluminum alkyl compounds and diethyl zinc. The scavengers and reactive compounds may be added to react with and/or to passivate the boiling point depressing agent remaining in the reaction system, particularly, if the remaining agent is in a location that may inhibit or alter polymerization such as that on the resin particles or the reactor walls.

Removal of bound water from the reactor internal surfaces may also be facilitated by certain of the agents of this invention due to their affinity for metals and their ability to essentially drive water off the surface. These include some of the previously mentioned chloro-flouro-hydrocarbons and amine compounds. Acetone, methanol and even isopentane may function in this manner. Removal of bound water is improved when contacted with the liquid agent. The present invention anticipates the use of such compounds to remove bound water and that reactor drying may be improved with such surface active agents than with other of the boiling point depressing agents.

The agents used for drying may first be dried to remove water prior to being added to the reactor. Drying methods are well known in the art and include distillation and the use of alumina or molecular sieve beds. The use of a dried agent is not a requirement for the practice of this invention, although it is prudent that the agent not contain large amounts of water. Preferably the agent contains less than 5 wt % water, more preferably less than 0.1 wt % water and most preferably much less than about 100 ppmw water. Agents that mix poorly with water, as for example isopentane, should be even drier, about 5 to 10 ppm water or less. This description of the amount of water allowable is not intended to constrain the practice of this invention, but to provide useful guidelines for its application. One skilled in the art may easily determine if a practical effectiveness of a particular agent can be improved by further drying, and this may depend upon when and how the agent is used in the reactor drying process. It is also obvious to one skilled in the art that the entire polymerization system must be dried prior to start-up including transfer lines between the reactors, feed systems and monomer recovery and recirculation devices associated with the system that removes polymer from the reactor. One skilled in the art also understands that the reactor is easily purged of air and oxygen using a gas such as nitrogen, and that the concentration of oxygen should be decreased to well below explosive or flammable limits prior to the introduction of hydrocarbons such as the boiling point depressing agents.

Other agents useful for water scavenging include compounds similar to dicyclohexylcarbodiimide (DCC) and 2,2-dimethoxy propane (DMP). DCC reacts with low concentrations of water at the central carbon to form a single larger molecule. An enol is first formed which tautomerizes to the keto form yielding a urea functionality. This adduct has less effect on polymerization than water due to its low vapor pressure and steric bulk. It may also act as a surface anti-foulant. The cyclohexyl groups improve DCC's solubility in hydrocarbons and may be replaced by other groups which include as illustrative non-limiting examples, $C_1$ to $C_{30}$ linear, branched and/or cyclic alkanes, species derived from fatty acids and/or aromatics.

DMP reacts with water to yield acetone and methanol which are easily purged from the reaction system and also act to lower the boiling point of water. The propane group of DMP may be replaced with $C_4$ to $C_{30}$ linear, cyclic or branched alkanes and/or aromatics which include as non-limiting illustrative examples butane, pentane, 3-methyl butane and 1-phenyl propane. The ether groups are attached at an internal carbon, usually at the 2 position, but may also be attached at a 3 or higher internal position. The substitution of groups higher than propane results in the formation of less volatile ketones when reacted with water. The butane group yields methyl ethyl ketone having a normal boiling point of 80° C., pentane may yield 2-pentanone with a 102° C. normal boiling point, 3-methyl butane yields 3-methyl- 2-butanone with a 94° C. normal boiling point and 1-phenyl propane yields 1-phenyl-2-propanone with a 216.5° C. boiling point. The use of other specific groups to replace the propane backbone can produce acetophenone, propiophenone, n-butyrophenone or benzophenone with respective normal boiling points of 202, 218, 232 and 306° C. The more volatile ketones can be purged from the reaction system and may also mix with water to form a minimum boiling azeotrope or to just lower its boiling point. The less volatile ketones may exhibit such low vapor pressure that they are inconsequential to polymerization and need not be removed from the reaction system. The methoxy ether groups of DCC may be replaced with $C_2$ to $C_{20}$ linear, branched, cyclic and/or aromatic groups including, for example, ethoxy, propoxy, butoxy, tert-butoxy and phenoxy. The dual ether linkages may be the same or different. When reacted with water, the resulting volatile alcohols are easily purged from the reaction system, and some such as ethanol, may also depress the normal boiling point of water to further aid its removal. Use of higher ether groups may form higher alcohols of such low volatility that they do not impede polymerization and need not be removed from the reaction system. Scavenging with DCC an DMP type compounds may be conducted at temperatures ranging from about −50 to 150° C. and preferably from about 60 to 120° C.

DCC and DMP type compounds may themselves have little effect on the polymerization and can be added at low levels as required to scavenge the water. In particular, several aliquots can be added to the reactor during the drying process, and the moisture in the cycle gas can be monitored until the water is essentially consumed. The DCC or DMP type compounds may also be added continually to the reactor system during polymerization to consume water. This water may be present from start-up or may be introduced with one of the reactor feedstreams. The DCC or DMP type feeds may be decreased or stopped a few hours after polymerization starts or may proceed indefinitely. The DCC or DMP type compounds may be added relative to the water present in the reaction system, generally on a 0.1 to 100:1 molar basis, but more preferably on a 1:1 to 10:1 molar basis. Typical concentrations in the polymer resin in the reactor range from about 0.01 to 500 ppmw. The DCC or DMP type compounds may be supported on a dehydrated porous or non-porous support such as silica gel and so added to the reactor. DCC or DMP type compound addition may be directly to the fluid bed portion of the reactor system, added to the gas circulation line, added before the heat exchanger to increase contact with the gas including the possibility that the feedstreams enter the reactor before the heat exchanger, and/or added to single or mixed feedstreams prior to entering the reactor. They can be used with an empty reactor or with one containing a seed bed. The amount of DCC or DMP type compounds added is such that water is reduced to an inconsequential level without greatly affecting the catalyst productivity. DCC and DMP type compound use is applicable to at least chromium, Ziegler-Natta and metallocene based catalysts and it is obvious to use different levels of the agents depending upon the catalyst system and its sensitivity to water and DCC or DMP type compounds.

Silicon compounds containing ether linkages are routinely used in Zielger-Natta and metallocene polymerization processes to improve the performance of the catalyst. Illustrative examples of such compounds include diisobutyl-dimethoxysilane and tetraethoxysilane. They are known to react with water to yield alcohols that may be easily purged from the reaction system. These silicon compounds may also be used to scavenge water in preparation for start-up. They may be added relative to the water present in the reaction system, generally on a 0.1 to 100,000:1 molar basis, but more preferably on a 1:1 to 10,000:1 molar basis. Typical concentrations in the polymer resin in the reactor range from about 0.01 to 50,000 ppmw, and are preferably in about the 0.1 to 5000 ppmw range. Scavenging with such silicon containing compounds may be conducted at temperatures ranging from about −50 to 150° C. and preferably from about 60 to 120° C. Relative to the water present in the reaction system, epoxides may be added generally on a 0.1 to 100:1 molar basis, but more preferably on a 1:1 to 10:1 molar basis.

They may be added to an empty reactor or to one containing a seed bed. Such silicon containing compounds may be supported on a dehydrated porous or non-porous support such as silica gel and so added to the reactor. Their addition may be directly to the fluid bed portion of the reactor system, to the gas circulation line, before the heat exchanger to increase contact with the gas including the possibility that the feedstreams enter the reactor before the heat exchanger, and/or to single or mixed feedstreams prior to entering the reactor.

The volatility of the resulting alcohol may be decreased by increasing the bulk of the ether group on the silicon compound, such that the alcohol has little effect on the ensuing polymerization and need not be removed from the reaction system. In this case, such silicon compounds may be added continuously or semi-continuously to the reaction system during polymerization to scavenge water. When so used in combination with a support material, they efficiently scavenge water with minimal effect on the polymerization process. It is obvious to chemically anchor the silicon compound to the support. Polymerization systems using such silica compounds typically employ aluminum alkyl cocatalysts, and the relative amounts of the components affects the performance of the catalyst and the characteristics of the polymer. Therefore, such silicon compounds may be used to scavenge water prior to the introduction of the aluminum alkyl The reaction of water with the aluminum alkyl is avoided—a reaction that has been implicated with poor reactor operation and sheeting. The aluminum alkyl may be added to the reaction system after water scavenging and/or purging, and the amount is adjusted relative to the approximate concentration of silicon compound remaining in or freshly added to the polymerization system in order to achieve the desired catalyst performance.

Water can also be scavenged from the polymerization system by reaction with epoxides which under acidic environments are known to yield diols. Illustrative examples of epoxides include ethylene oxide, propylene oxide, trimethylene oxide, and cyclohexene oxide. Diols formed include ethylene glycol and propylene glycol, and present less of a problem to polymerization than water due to their reduced volatility. Furthermore, the diols may function as surface anti-fouling agents during polymerization so they need not be essentially removed prior to polymerization. The epoxides may also be used as an agent to lower the boiling point of water. Reactive scavenging of water by epoxides can be done alone or in combination with boiling point depressing agents.

Reactive scavenging can occur before, during or after the use of boiling point depressing agents. Scavenging with epoxides may be conducted at temperatures ranging from about −50 to 150° C. and preferably from about 60 to 120° C. Relative to the water present in the reaction system, epoxides may be added generally on a 0.1 to 100:1 molar basis, but more preferably on a 1:1 to 10:1 molar basis. They may be added to an empty reactor or one containing a bed. Typical concentrations in the polymer resin in the reactor range from about 0.01 to 500 ppmw. Epoxides may be added directly to the fluid bed portion of the reactor system, added to the gas circulation line, added before the heat exchanger to increase contact with the gas including the possibility that the feedstreams enter the reactor before the heat exchanger, and/or added to single or mixed feedstreams prior to entering the reactor. Epoxides may be added continuously or semi-continuously during the polymerization as a scavenger with little impact on the catalyst performance. The reaction products may be relatively non-volatile and may also function as anti-fouling agents in the reactor. The epoxides, particularly the less volatile variety, may be supported or anchored to a porous or non-porous support material such as alumina or silica gel and so added to the reactor. It is obvious during the supporting process of the epoxides or other scavenging agents that it may be desirable to insure that essentially all the scavenger is bound either chemically or physically to the support so that none or essentially none diffuses into the reaction medium.

The water can also be scavenged from the polymerization system by adsorption with agents that are highly hydrophilic. This greatly reduces water's effect on polymerization. Illustrative examples of such compounds include the amines, amides and nitrites previously discussed. An additional example is represented by the formula:

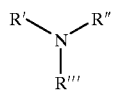

wherein R' is an alkyl having 2 to 22 carbon atoms; R" is a hydroxylalkyl having 2 to 22 carbon atoms; R'" is selected from the group consisting of R' and R". Examples of suitable agents include N,N-bis-(2- hydroxyethyl) alkylamine, N-(2-hydroxyethyl) dialkylamine, N,N-bis-(2-hydroxypropyl) alkylamine, N,N-bis-(2-hydroxybutyl) alkylamine and like compounds. The agent is preferably dissolved in a suitable solvent such as hexane, isopentane, or mixtures thereof A particularly suitable composition containing the compound is available commercially under the tradename ATMER® 163 which is available from ICI Americas, Inc., Wilmington, Del. This composition includes at least 97% by weight of N,N-bis-(2- hydroxyethyl) alkylamine and has a specific gravity of 0.91, a pH value of 9.8 (10%) in water, and a flash point of about 126° C. Such hydrophilic agents may be added at a level of about 0.05 to 500 ppmw on a resin weight basis, preferably at about a 0.1 to 100 ppmw basis such that the performance of the catalyst is relatively unaffected. The hydrophilic agents may be added to the empty reactor or to the reactor seed bed—addition to the empty reactor based upon about a 1:1 to 100:1 molar ratio of water in the reaction system. Because it is used to scavenge water, it can be added before the addition of metal alkyls to the reaction system.

The hydrophilic scavenger may be added with solvent and dispersed in the reactor such that it collects in the low lying regions of the reactor and associated piping where the liquid water is trapped. Water bound to the scavenger and excess scavenger in such locations have little effect on the polymerization catalyst even when present at high localized concentrations. Such scavengers may be used to scavenge water prior to polymerization or during the polymerization process by continuous or intermittent addition, and may be added as liquids, solids or on a dehydrated porous or non-porous support such as finely divided silica gel. Such compounds may also be used as anti-static and/or anti-fouling agents for the polymerization process as is well known in the art. For the purpose of this invention, their function and use is to scavenge water from the reaction system.

Other methods that can be used to dry the reaction system include the use of compounds such as calcium carbide which reacts with water to liberate acetylene and leaves calcium oxide or other metal oxide. The calcium carbide may be finely divided to improve its effectiveness or may be dispersed on a support. It can be added to an empty reactor or to one containing a seed bed. As with other drying agents, it can be added at a variety of locations to the polymerization. Calcium carbide may be added relative to the water present in the reaction system, generally on a 0.1 to 1000:1 molar basis, but more preferably on a 1:1 to 100:1 molar basis. Typical concentrations in the polymer resin in the reactor range from about 0.01 to 500 ppmw. The calcium oxide is relatively inert to polymerization and the acetylene may be easily removed if desired. Calcium carbide remaining in the resin after polymerization will react with water in the environment or downstream handling equipment to form acetylene. Small amounts of calcium carbide corresponding to about a 0.1 to 500:1 calcium carbide to water molar ratio may be added during polymerization. Concentrations in the resin range from about 0.01 to 500 ppmw. In one method, the calcium carbide is added the catalyst, either co-supported with it or on a separate support, or as a slurry mixed with a solution or slurry catalyst feed to the reactor. In a preferred method, water is scavenged using calcium carbide and reactor operational problems such as sheet formation and fouling due to water's interaction with the aluminum alkyl cocatalyst are avoided or reduced. The residual calcium carbide may be deactivated with steam or moist nitrogen afterwards.

Another class of drying agent includes dihalogen gases such as chlorine trifluoride which react rapidly with water yielding acids. Such compounds may be added to excess such that all the water is consumed. Corrosion concerns for the acid are reduced in absence of free water. These acids may affect the subsequent polymerization but are easy to purge from the reaction system when all the water is consumed. A safety concern is that the halogen gases are strong oxidants and react violently with metal alkyls. These methods may be used alone or in conjunction with other drying methods including the use of a water boiling point depressing agent.

All references cited herein are incorporated by reference.

Whereas the scope of the invention is set forth in the appended claims, the following specific examples illustrate certain aspects of the present invention. The examples are set forth for illustration only and are not to be construed as limitations on the invention, except as set forth in the claims. All parts and percentages are by weight unless otherwise specified.

EXAMPLES

Example 1

A reaction system having previously contained a metallocene based polymer with a melting temperature of about 105° C. was employed, so precautions were taken not to exceed that temperature during the drying procedure. The cycle gas blower in the recirculation loop and the cycle gas heat exchanger were water blasted to remove polymer deposits, but the reactor body was not water blasted. The drying procedure was conducted without the benefit of the boiling point depressing agent. The drying procedure consisted of repeated pressure purges from 150 to 5 psi with hot nitrogen. Nitrogen was heated using hot water applied to the shell side of the gas recirculation loop shell and tube heat exchanger. The temperature of the heat exchanger was allowably higher because it had been previously cleaned. The temperature of the gas at the inlet of the heat exchanger was in the range of about 100 to 103° C. which was within about 1 to 5° C. of the melting point of the resin.

The polymerization system required 18 hours to dry to less than 30 ppmv water in the re-circulating gas. The drying rate was fairly steady over the entire moisture range, decreasing nearly linearly first from 420 to 200 ppmv in 4 hours, and then linearly from 200 to 30 ppmv in about 14 hours.

Example 2

To a reactor system as described in Example 1, the reactor body including the distributor plate and expanded section were water blasted along with some of the pipes composing the gas recirculation loop. The blower and the heat exchanger were not water blasted. The drying procedure was conducted without the benefit of the azeotrope forming agent. To dry, the reactor was repeatedly pressure purged from 150 to 5 psi with hot nitrogen heated using water at a temperature of about 100° C. applied to the heat exchanger. The maximum temperature of the heat exchanger was limited by the presence of metallocene based resin which had a melting point of about 105° C. The system required more than 60 hours to dry to less than 30 ppmv water in the re-circulating gas. The drying in the 50 to 80 ppmv range was protracted and may have corresponded to the presence of liquid water in the tubes and piping connected to the reactor body and recirculation piping.

loosened to blow out trapped water. The reactor was pressure checked and the nozzles and bed pressure taps blown clear to remove trapped water. The reactor was purged twice with nitrogen at 60° C. to remove residual air from the system and all instrument leads to the system were blown to the atmosphere. The system moisture ($H_2O$) content was measured to be 500 ppmv in the recirculating gas. Prior to starting the boiling point depressing agent drying procedure, the reactor temperature was raised to 99° C. and the pressure was decreased to 5 psig.

A total of 3.25 liters of liquid isopropanol were charged to the reactor from a pressurized vessel and allowed to circulate as a vapor at 80° C. and 7 psig system pressure for 1 hour. The temperature was then decreased to 24° C. with the pressure maintained at about 15 psig and the gas circulated for about 1.75 hours. The reactor was heated to about 115° C., and the total pressure was raised to 150 psig by adding nitrogen. The reactor was then vented over a period of about 10 minutes to about 5 psig. A slow vent was used rather than a fast vent to reduce the cooling effect of the blow down on the polymerization system. The pressure was held for 20 minutes in the 5 to 20 psig range before re-pressurizing with nitrogen to 150 psi and readjusting the temperature to 115° C. The venting procedure was then repeated. The system moisture content was measured signaling the end of the boiling point depressing agent drying procedure. The moisture content was 190 ppmv.

Routine pressure purge cycles were initiated using nitrogen pressure purges from 150 to 5 psig with the nitrogen heated by water at about 120 to 125° C. on the shell side of the system heat exchanger. In this cycle, the reactor was vented to 5 psig and re-pressurizing began immediately. The pressure increased asymptotically to 150 psi as the nitrogen supply pressure was only slightly above the aim pressure for the purging step. The reactor heated and cooled with each

| Example | Drying Agent | Apparatus Water Blasted | Initial $H_2O$ Conc. (ppmv) | Total Time to Dry to 30 ppmv (hrs) | Total Time Dry to 10 ppmv (hrs) |
|---|---|---|---|---|---|
| 1 | None | Blower and Heat Exchanger | 420 | 18 | 20 |
| 2 | None | Reactor and Lines | >1000 | 60 | — |

| Example | Drying Agent, Amount | Apparatus Water Blasted | Initial $H_2O$ Conc. (ppmv) | Treatment Time (hrs) | $H_2O$ Conc. After Treatment (ppmv) | Post Treatment Time to Dry to 30 ppmv (hrs) | Post Treatment Time to Dry to 10 ppmv (hrs) |
|---|---|---|---|---|---|---|---|
| 3 | Isopropanol 3.25 L | All | 500 | 12 | 190 | 9 | N/A |
| 4 | Isopropanol 3 L | All | 400 | 7 | 360 | 9 | 16 |
| 5 | Isopropanol 3 L | All | 500 | 8 | 200 | 20 | 23 |
| 6 | Isopropanol 3 L | All | 700 | 8 | 80 | 7 | 8 |
| 7 | Isopropanol 3 L | Only Reactor | >1000 | 5 | 200 | 25 | — |

Example 3

The entire polymerization system described in the previous examples was water blasted, allowed to "drip dry" (the reactor left opened and partially disassembled and allow to dry at atmospheric conditions for a few hours) and reassembled. The reactor was pressured to 50 psi with nitrogen and the low lying fittings and flange connections were cycle as the pressure built-up and was vented. Sufficient time was allowed at the high pressure for the temperature measured in the reactor body to reach about 113° C.

The moisture level decreased from 190 to 90 ppmv within one hour of starting the routine pressure purges. The moisture level continued to be measured hourly and showed a steady decline to 30 ppmv over 9 hours. The drying was discontinued and a passivation procedure using triethylaluminum initiated in preparation for a reactor start-up.

Calculations confirm that isopentane was vaporized at 80° C. and then condensed as the temperature was lowered to 24° C. Reheating the system vaporized the boiling point depressing agent. Isopropanol and water azeotrope at atmospheric pressure boil at 80.4° C. and are composed of a single phase containing 87.8 wt. % isopropanol and 12.2 wt. % water. Based upon the measured 500 ppmv water in the 65 ft$^3$ reactor volume and arbitrarily doubling it to account for the presence of liquid water, suggested the presence of about 0.077 moles of water in the polymerization system. This required the addition of at least 0.17 moles of isopropanol to achieve excess isopropanol beyond the azeotropic composition and corresponded to about 0.02 liters isopropanol. The added 3.25 liters of isopropanol were a sufficient excess.

Example 4

The entire polymerization reaction system described in the previous examples was water blasted and prepared for the azeotropic treatment following a procedure similar to that of Example 3. The initial moisture concentration was 400 ppmv before 3 liters of isopropanol were added at a temperature of 79° C. and a reactor pressure of about 5 psig. The isopropanol was circulated for about 1.5 hours during which time the pressure was steadily increased to about 79 psi. The reactor temperature was decreased to 30.3° C. and the cycle gas circulated an additional 1.75 hours. The temperature was then increased to about 115° C., and the pressure was raised to about 180 psig. Three pressure purges were then taken from about 150 to 5 psig using nitrogen as make-up gas. The water concentration in the reactor vapor space was measured then measured to be 360 ppmv and continued to decrease rapidly as the pressure purging continued. The moisture level was about 200 ppmv after 1 hour; 130 ppmv after 2 hours; 100 ppmv after 3 hours; 60 ppmv after 5 hours; and 45 ppmv after 6 hours. Nine hours were required to reach 30 ppmv. Contributing to the initially high water concentration in the reactor was the fact that the contents of a cool, small tubing line connected to the reactor may have contained a residual liquid pool of water and isopropanol. This line was blown with nitrogen into the reactor following the three pressure purges after the azeotrope drying procedure and just before the first moisture analysis. The reactor continued to dry for a total of 16 hours and reached a moisture content of less than 10 ppmv water.

Example 5

An entire polymerization system as described in the previous examples was water blasted and prepared for the treatment with the azeotrope agent according to the procedure of Example 3. The initial moisture concentration was 500 ppmv before starting the procedure. Three liters of isopropanol were added and the procedure was conducted as described in Examples 3 and 4, except that the purge cycle during the final venting step was faster, about one purge every half hour. Consequently, the time the reactor was held at the higher pressure was reduced so that it did not reach the maximum steady state temperature. This may have contributed to the longer drying time. The initial post-treatment moisture concentration was 200 ppmv. After 8 hours, the moisture content had decreased to 90 ppmv and stayed there for two hours. The reactor pressure was brought up to 148 psig and was maintained at that level an additional 15 minutes to afford better heating of the system before venting down. The water level dropped to 70 ppmv during the next hour, reaching 50 ppmv 5 hours later. An additional 1 liter of isopropanol was then injected to a which increased the water content in the cycle gas to over 200 ppmv. Pressure purging with heated nitrogen reduced the concentration of water to less than 30 ppmv within four hours in preparation for reactor start-up.

Example 6

An entire polymerization system similar to those of the previous examples was water blasted about 36 hours before the drying sequence began. The flanges and lines were cleared of water as in Example 3, and the system purged twice with nitrogen and the moisture reading was recorded. The reactor temperature was set at 110° C. and the reactor blown down to 5 psig while at 110° C. Three liters of isopropanol were added to the system and circulated for 1 hour at 50 psig at 110° C. The temperature was decreased to 25° C., and isopropanol was circulated for 1 hour. The reactor pressure was increased to 300 psig as the temperature was increased to about 120° C. and maintained there for about 30 minutes. Next, the reactor was vented to 5 psig while maintaining the temperature at about 120° C. The pressure was maintained at 5 psig pressure for 10 minutes to allow time for the water, isopentane and azeotrope to evaporate, possibly by boiling. The reactor was purged from 150 to 5 psig with nitrogen and the pressure held for 10 minutes at the low pressure two more times. Routine purges from 150 to 5 psig at 120° C. were then started, and 7 were completed prior to obtaining a moisture analyses of 80 ppmv. The moisture remained at about 80 ppmv for 3 hours as the reactor continued to be purged. At about this time, a tubing line connected to the reactor was found to be isolated from the reactor by a closed valve. Because the line would normally be in service during reactor operation, the valve was opened. The line apparently contained a considerable amount of water because the moisture level in the reactor responded by increasing to 800 ppmv. Yet, within 5 hours, the water concentration dropped to 6 ppmv. A start-up seed bed was charged to the reaction vessel, and it dried in 9 hours from an initial concentration of 1000 ppmv to 8 ppmv.

Example 7

In this example, only the reactor body was water blasted, not the recirculation lines, the blower or the heat exchanger. The reactor was similar to those used in the previous examples and was prepared for the drying procedure in a manner similar to Example 3. The reactor was purged twice with hot nitrogen, all lines to the reactor were blown to atmosphere to clear them of liquid water, and the moisture content was measured at 1000 ppmv. The reactor temperature was set to 85° C., and the pressure was set to 5 psig before 3 liters of isopropanol were added. The isopropanol was circulated for 0.5 hours at 50 psi pressure. The reactor was then cooled to 25° C. and the isopropanol circulated for another 40 minutes. Next, the temperature was increased to 120° C. The pressure was increased to 380 psi before venting the reactor to 5 psig and holding that pressure for 10 minutes while the temperature was maintained as close as possible to 120° C. Two additional nitrogen purges from 150 to 5 psig were taken with the pressure held at 5 psig for 10 minutes at the low end of the cycle. The reactor was repressured to 150 psi with nitrogen and the moisture content was measured to be 200 ppmv. It required only 3 hours to decrease from 200 to 80 ppmv, but an additional 22 hours was required to dry from 80 ppmv to 30 ppmv. No additional isopropanol was added. The reactor was dried an additional 8 hours to reach about 20 ppmv before a start-up seed bed of polymer resin was charged. The water level increased to more than 1000 ppmv, but decreased to 30 ppmv in 11 hours, reaching 15 ppmv 9 hours later. The moisture stayed at 15 ppmv during an additional 10 hours of drying.

Example 8

Comparative Example Using Insufficient Amount of Ethyl Ether

The entire polymerization system similar to those of the previous examples was water blasted, allowed to "drip dry" and reassembled. The system was pressure checked at 150 and 300 psig with nitrogen. Low lying fittings and flange connections were loosened and blown with reactor gas to atmosphere to remove trapped water. The reactor was repeatedly pressure purged with nitrogen at 100° C. from 150 to about 5 psig until a level of 80 ppmv water remained in the re-circulating gas. One liter of ethyl ether was injected and circulated for one hour while the reactor pressure was set at 5 psig and the temperature was controlled at 50° C. The reactor temperature was then lowered to 29° C., and the ethyl ether was circulated for about 1.5 hours at a reactor pressure of about 120 psig maintained with nitrogen. The temperature was next increased to about 80° C. and the system was vented to 5 psig. There was no hold time at the lower pressure. Ten nitrogen pressure purges from 150 to 5 psig were executed over the next 12 hours at a temperature of at about 80° C. The moisture level in the circulating gas was then measured and found to be 30 ppmv. The temperature was increased from 80° C. to about 120° C., and the moisture level increased to 50 ppmv. An additional 8 hours of drying and nitrogen pressure purges decreased the moisture content to 28 ppmv, and in 4 more hours it decreased to 15 ppmv. A start-up bed seed bed was charged to the system, and it was dried in 7 hours to 8 ppmv with recirculating nitrogen.

Subsequent calculation showed that the minimum system temperature of 29° C. was insufficient to condense the amount of added ethyl ether. More than 8 liters of ethyl ether would have been required to have been added to the system volume of about 65 to 70 cubic feet in order to achieve condensation at the normal boiling point of ethyl ether of 34.6° C. Only one liter had been added. The failure to improve the reactor drying is attributed to the failure to condense the ethyl ether to allow it to mix freely with the water in the polymerization system. The one liter amount had been selected based solely on the amount required to form the azeotrope, 98.8 wt % ether and 1.2 wt % water with a boiling point of 34.2° C. at atmospheric pressure.

What is claimed is:

1. A process for removing water from a gas phase polymerization reactor system having therein cool regions in which the water resides, said system optionally containing a resin bed, the removal being effected prior to carrying out a polymerization in the system, comprising
    (a) providing at least one compound in solid, liquid, or gaseous form capable of reducing the boiling point of water by at least about 2 degrees C.;
    (b) introducing the compound(s) into the system;
    (c) vaporizing the compound(s), which are in solid or liquid form, if any, into the gaseous form;
    (d) passing the compound(s) in gaseous form into the cool regions of the system wherein the gases condense to a liquid, and said liquid mixes with the water reducing the boiling point of the water;
    (e) increasing the temperature of and/or reducing the pressure in the system to vaporize the liquid/water mixture; and
    (f) removing the liquid/water mixture in vapor form by purging or venting from the system.

2. The process defined in claim 1 wherein the compound referred to in step (a) forms an azeotrope or zeotrope with water.

3. The process according to claim 1 wherein the boiling point depressing agent or at least one or more of the compounds comprising the boiling point depressing agent improves the performance of the polymerization catalyst or suppresses, reduces or eliminates fouling of the inner surfaces of the reactor system.

4. The process according to claim 1 wherein additionally there is employed a scavenging agent selected from the group consisting of (i) an aluminum or zinc alkyl, (ii) a compound containing an strained-ring epoxide, (iii) an alkyl carbodiimide, (iv) calcium carbide, (v) a dihalogen gas, (vi) a silicon based compound having at least one alkyl ether group.

5. The process of claim 4 wherein the scavenging agent is selected from the group consisting of dicyclohexylcarbodiimide; 2,2-dimethyloxypropane, chlorine, trifluoride, and mixtures thereof.

6. The process according to claim 4 wherein the scavenging agent is selected from the group consisting of N,N-bis-(2-hydroxyethyl) alkylamine, N-(2-hydroxyethyl) dialkylamine, N,N-bis-(2-hydroxypropyl) alkylamine, N,N-bis-(2-hydroxybutyl) alkylamine, and mixtures thereof.

* * * * *